US012415919B2

(12) United States Patent
Czaplicki et al.

(10) Patent No.: US 12,415,919 B2
(45) Date of Patent: Sep. 16, 2025

(54) TWO-PART PHOSPHATE ESTER EPOXY COMPOSITION

(71) Applicant: Zephyros, Inc., Romeo, MI (US)

(72) Inventors: Michael Czaplicki, Romeo, MI (US); Hamid Mortazavian, Romeo, MI (US); Kevin Hicks, Romeo, MI (US)

(73) Assignee: ZEPHYROS, INC., Romeo, MI (US)

( * ) Notice: Subject to any disclaimer, the term of this patent is extended or adjusted under 35 U.S.C. 154(b) by 490 days.

(21) Appl. No.: 17/422,922

(22) PCT Filed: Mar. 25, 2020

(86) PCT No.: PCT/US2020/024629
§ 371 (c)(1),
(2) Date: Jul. 14, 2021

(87) PCT Pub. No.: WO2020/205355
PCT Pub. Date: Oct. 8, 2020

(65) Prior Publication Data
US 2022/0089859 A1    Mar. 24, 2022

Related U.S. Application Data

(60) Provisional application No. 62/828,691, filed on Apr. 3, 2019.

(51) Int. Cl.
C08L 63/00    (2006.01)

(52) U.S. Cl.
CPC .......... *C08L 63/00* (2013.01); *C08L 2205/02* (2013.01); *C08L 2205/035* (2013.01)

(58) Field of Classification Search
CPC ............. C08L 63/00; C08L 2205/02; C08L 2205/035; C08J 2201/02; C08J 2201/026; C08J 2203/02; C08J 2363/00; C08J 9/0038; C08J 9/08; C08K 5/521; C08K 3/26; C08G 59/4071; C08G 59/063; C08G 59/306
See application file for complete search history.

(56) References Cited

U.S. PATENT DOCUMENTS

| | | |
|---|---|---|
| 2,541,027 A | 2/1951 | Bradley |
| 2,739,134 A | 3/1956 | Parry et al. |
| 2,831,820 A | 4/1958 | Aase et al. |
| 3,256,240 A | 6/1966 | Corporation |
| 3,282,863 A | 11/1966 | Carey et al. |
| 3,317,471 A | 5/1967 | Johnson et al. |
| 4,016,112 A | 4/1977 | Kajiura et al. |
| 4,119,583 A | 10/1978 | Filip et al. |
| 4,123,575 A | 10/1978 | Wesch et al. |
| 4,164,487 A | 8/1979 | Martin |
| 4,164,489 A | 8/1979 | Martin |
| 4,196,270 A | 4/1980 | Chattha |
| 4,438,254 A | 3/1984 | Doorakian et al. |
| 4,613,661 A | 9/1986 | Langer |
| 4,619,860 A | 10/1986 | Brown et al. |
| 4,623,478 A | 11/1986 | Pastorino |
| 4,647,648 A | 3/1987 | Silvis et al. |
| 4,820,784 A | 4/1989 | Massingill et al. |
| 4,853,455 A | 8/1989 | Schneider |
| 4,992,525 A | 2/1991 | Kriessmann et al. |
| 5,086,094 A | 2/1992 | Massingill, Jr. |
| 5,115,075 A | 5/1992 | Brennan et al. |
| 5,331,080 A | 7/1994 | Swarup et al. |
| 5,552,070 A | 9/1996 | Schafer |
| 5,648,401 A * | 7/1997 | Czaplicki ................. C08J 9/08 521/85 |
| 6,011,111 A | 1/2000 | Brennan et al. |
| 6,110,982 A | 8/2000 | Russick et al. |
| 6,730,713 B2 | 5/2004 | Czaplicki |
| 7,087,663 B2 | 8/2006 | Feola et al. |
| 7,097,794 B2 | 8/2006 | McLeod et al. |
| 7,445,400 B2 | 11/2008 | Takeuchi |
| 7,579,068 B2 | 8/2009 | Allen et al. |
| 7,838,100 B2 | 11/2010 | McLeod et al. |
| 8,809,422 B2 | 8/2014 | Lienert et al. |
| 9,067,382 B2 | 6/2015 | Shepherd et al. |
| 9,187,592 B2 | 11/2015 | Finter et al. |
| 10,106,711 B2 * | 10/2018 | Elgimiabi .............. B32B 15/04 |
| 10,550,220 B2 | 2/2020 | Czaplicki et al. |
| 10,557,015 B2 * | 2/2020 | Piestert .................... C09D 7/43 |

(Continued)

FOREIGN PATENT DOCUMENTS

| | | |
|---|---|---|
| AU | 2020/256063 A1 | 7/2021 |
| CN | 107624123 A | 1/2018 |

(Continued)

OTHER PUBLICATIONS

Ifuku; Shinsuke, Amino acid-cured bio-based epoxy resins and their biocomposites with chitin- and chitosan-nanofibers, Eur. Polym. J., 98 2018, pp. 216-225 (Year: 2018).*
English Translation of JP-2004002385-A (Year: 2004).*
Ifuku; Shinsuke, Amino acid-cured bio-based epoxy resins and their biocomposites with chitin- and chitosan-nanofibers, Eur. Polym. J., 98 2018, pp. 216-225 (Year: 2018) (Year: 2018).*
Somisetti Varaprasad et al: "Multifunctional polyurethane coatings derived from phosphate cardanol and undecylenic acid based polyols", Progress in Organic Coatings, vol. 134, May 9, 2019, pp. 91-102, XP085721770, ISSN: 0300-9440, DOI: 10.1016/J.Porgcoat.2019. 04.077 Scheme 2, p. 94.

(Continued)

*Primary Examiner* — Mark Eashoo
*Assistant Examiner* — Cullen L G Davidson
(74) *Attorney, Agent, or Firm* — The Dobrasin Law Firm, P.C.

(57) ABSTRACT

A two-part system comprising a first component including one or more epoxy resins or epoxy-functionalized resins and a second component including one or more phosphate esters, wherein the first component and second component are liquid at room temp and upon mixing the first component with the second component at room temperature, a composition is formed that is solid.

21 Claims, No Drawings

(56) References Cited

U.S. PATENT DOCUMENTS

| | | |
|---|---|---|
| 10,570,258 B2 | 2/2020 | Richardson et al. |
| 11,535,698 B2 | 12/2022 | Czaplicki |
| 2002/0115736 A1 | 8/2002 | Koshy |
| 2002/0192387 A1 | 12/2002 | Agarwal et al. |
| 2003/0060522 A1 | 3/2003 | Czaplicki |
| 2003/0060523 A1 | 3/2003 | Czaplicki |
| 2004/0077801 A1 | 4/2004 | Feola et al. |
| 2007/0270515 A1 | 11/2007 | Chmielewski et al. |
| 2008/0161432 A1 | 7/2008 | Korwin-Edson et al. |
| 2009/0298974 A1 | 12/2009 | Chmielewski et al. |
| 2012/0136094 A1 | 5/2012 | Chen |
| 2013/0115442 A1 | 5/2013 | Sang |
| 2014/0199549 A1 | 7/2014 | Shin |
| 2016/0229965 A1* | 8/2016 | Chmielewski ............. C08J 5/18 |
| 2016/0244596 A1 | 8/2016 | Piotrowski |
| 2018/0037695 A1 | 2/2018 | Czaplicki et al. |
| 2018/0111349 A1 | 4/2018 | Polidore et al. |
| 2018/0155519 A1 | 6/2018 | Shepherd et al. |
| 2020/0317459 A1 | 10/2020 | Toney |
| 2021/0363395 A1 | 11/2021 | Jung et al. |
| 2021/0395475 A1 | 12/2021 | Abe et al. |
| 2021/0395478 A1 | 12/2021 | Czaplicki et al. |
| 2022/0089859 A1 | 3/2022 | Czpalicki et al. |

FOREIGN PATENT DOCUMENTS

| | | | |
|---|---|---|---|
| EP | 0188689 A2 | 7/1986 | |
| EP | 0253005 A1 | 1/1988 | |
| EP | 0288942 A2 | 11/1988 | |
| EP | 0794236 A1 | 9/1997 | |
| EP | 1863634 B1 | 12/2007 | |
| EP | 2060592 | 5/2009 | |
| EP | 2426160 | 9/2012 | |
| EP | 2475702 B1 | 7/2016 | |
| EP | 2551992 B1 | 4/2017 | |
| EP | 2736999 B1 | 11/2018 | |
| EP | 3670564 A1 | 6/2020 | |
| EP | 3880742 A1 | 3/2023 | |
| JP | S63-305121 A | 12/1988 | |
| JP | H09227709 A | 9/1997 | |
| JP | 1998101836 A | 4/1998 | |
| JP | H10101836 A | 4/1998 | |
| JP | H11013166 A | 1/1999 | |
| JP | 2001-081223 A | 3/2001 | |
| JP | 2003064209 A | 3/2003 | |
| JP | 2004002385 A * | 1/2004 | |
| JP | 2004-099663 A | 4/2004 | |
| JP | 2017171767 A | 9/2017 | |
| WO | 98/14498 | 4/1998 | |
| WO | 98/42762 A1 | 10/1998 | |
| WO | 2006/104623 A3 | 10/2006 | |
| WO | 2008/010823 A2 | 1/2008 | |
| WO | 2008/131918 A1 | 11/2008 | |
| WO | 2014/198573 A1 | 12/2014 | |
| WO | 2016/081357 A1 | 5/2016 | |
| WO | WO-2016149700 A1 * | 9/2016 | ......... C08G 59/1488 |
| WO | 2020/101732 A1 | 5/2020 | |
| WO | 2020/198139 A1 | 10/2020 | |
| WO | 2020/205355 A1 | 10/2020 | |
| WO | 2020/206436 A1 | 10/2020 | |
| WO | 2022/271781 A1 | 12/2022 | |

OTHER PUBLICATIONS

International Search Report & Written Opinion, Application No. PCT/US2020/024629 dated Aug. 12, 2020.
Xian-Ling Eu et al: "Two-dimensional 1-36 cardonal-derived zircomium phosphate as flame retardant and smoke depressant for epoxy resins.e", Polymer Degradation Fand Stability, vol. 151, Jun. 3, 2018.
Japanese Office Action, Application No. JP 2021-541435 dated Sep. 22, 2022.
International Search Report & Written Opinion dated Sep. 23, 2022, Application No. PCT/US2022/034455.
International Search Report & Written Opinion dated Aug. 28, 2020, Application No. PCT/US2020/026712.
International Search Report & Written Opinion dated Jan. 21, 2022, Application No. PCT/US2021/054100.
International Search Report and Written Opinion dated Jul. 22, 2019, Application No. PCT/US2019/030831.
International Search Report & Written Opinion dated Feb. 23, 2023, Application No. PCT/US2022/048349.
International Search Report & Written Opinion dated Dec. 19, 2022, Application No. PCT/US2022/043669.
International Search Report & Written Opinion dated Dec. 19, 2022, Application No. PCT/US2022/042316.
Extended European Search Report dated Jun. 21, 2022, Application No. 22158328.9.
Japanese Office Action dated Sep. 22, 2022, Application No. JP2021-541435.
India Examination Report dated Nov. 15, 2022, Application No. 2021/17018838.
Chinese First Office Action dated Aug. 17, 2022, Application No. 201980075521.4.
European Communication dated Sep. 4, 2020, Application No. 16716983.8.
India First Examination Report dated Jan. 30, 2020, Application No. 201737032259.
Chinese Second Office Action dated May 14, 2020, Application No. CN201680028264.5.
Jiao et al., "Synthesis and properties of a phosphate ester as curing agent in an epoxy resin system" Iran Polym J., (2014) 23: 5941-598.
Japanese First Office Action dated Mar. 2, 2023, Application No. 2021523472.
Canadian Second Office Action dated Mar. 29, 2023, Application No. 3117663.
Chinese Notification of the First Office Action dated May 13, 2023, Application No. 202080026387.1.
Japanese First Office Action dated Jul. 8, 2024, Application No. JP 2023-074658.
US Office Action, U.S. Appl. No. 17/289,166 dated Aug. 27, 2024.

* cited by examiner

TWO-PART PHOSPHATE ESTER EPOXY COMPOSITION

FIELD

The present teachings relate generally to a composition having a first component and a second component and method of using the composition. More specifically, the present teachings relate to epoxy and phosphate ester-based structural foams.

BACKGROUND

Room temperature cured and foamed rigid structural foams are frequently employed in many industries such as aerospace, automotive, commercial vehicles, construction, electronics and elsewhere for a variety of purposes. For example, rigid structural foam materials may be used to provide structural support, sealing and sound attenuation in the transportation and construction industries.

Where room-temperature activation (e.g., expansion) is desired, polyurethane-based materials are most common. Polyurethane materials have a number of drawbacks, some of which are inclusion of isocyanate, a limited ability to adhere to certain substrates, poor hydrolysis resistance in wet or humid environments, unsuitability to create slower reacting systems, high sensitivity to temperature changes that create process and expansion variability during dispensing and foaming, and a need for high specificity in mix ratios when formulating.

As an alternative to polyurethane-based materials, phosphoric acids can be used as a sole curing agent for epoxide functional materials (e.g., polymeric materials) to create rigid structural foam materials. However, phosphoric acid leads to additional concerns. As one example, reaction time with phosphoric acid is very fast which is not ideal for assembly processes that require time to locate the polymeric material onto a surface prior to foaming. Thus, a somewhat delayed reaction time may be preferable for some applications. In some situations, there might be concern about low pH and splash hazards of phosphoric acid. Therefore, alternative materials with higher pH and reduced splash hazard may be preferred. There is also a significant difference in viscosity between the phosphoric acid and the polymeric material. This presents challenges to both manufacturing (e.g., mixing) and storage of the material. Phosphoric acid also has a much lower molecular weight than many polymeric materials, leading to undesirable mix ratios. Relatively similar mix ratios of 1:1, 2:1, 4:1, or 10:1 would be preferable. Lastly, the reactive nature of phosphoric acid makes it difficult to formulate rigid foam materials as so many chemical components may be unstable when utilized in conjunction with phosphoric acid due to its high general reactivity. It would be preferable to have the ability to include a variety of different moieties that may be advantageous for adhesion, physical or chemical compatibility, or other reasons.

International Publication No. WO 2016/149700 A1, incorporated by reference herein for all purposes, discloses the use of phosphate esters as an alternative to phosphoric acid.

Notwithstanding the above teachings, there has remained a need for improved rigid foam materials. There is a need for rigid foam materials which cure at room temperature (e.g., ambient temperature). There is a need for rigid foam materials which provide for expansion and cross-linking at reduced temperatures as compared to known rigid foam materials which expand and cross-link in more variable ways as a result of ambient temperature changes. There is a need for rigid foam materials which provide adhesion to a wide variety of substrates including potentially contaminated surfaces. There is need for rigid foam materials which utilize a component capable of both curing and foaming without the need for additional components. There is a need for rigid foam materials which provide desirable fire, smoke, and toxicity (FST) properties while eliminating the use of undesirable agents for imparting the same. The present teachings provide one or more of the above-mentioned benefits.

SUMMARY

The present teachings provide for a two-part system comprising a first component including one or more epoxy resins or epoxy-functionalized resins, and a second component including one or more phosphate esters, wherein the first component and second component are liquid at room temp and upon mixing the first component with the second component at room temperature, a composition is formed that is solid.

Upon mixing the first component and second component, the composition may react to create an acceptable finished product over a temperature range of about 0° C. to about 50° C. Upon mixing the first component and second component the composition may undergo volume expansion of 0% to 500%. The second component may include at least two, or even at least three of the one or more phosphate esters. The one or more phosphate esters may include a phosphate ester derived from cashew nutshell liquid (CNSL). The one or more phosphate esters may include a phosphate ester derived from 2-ethylhexyl glycidyl ether. The one or more phosphate esters may include a phosphate ester derived from phenyl glycidyl ether. The one or more phosphate esters may include a phosphate ester derived from an epoxidized paratertiary butyl phenol. The one or more phosphate esters may include a nonyl phenol ethoxylated phosphate ester. In general, any mono-functional epoxide can be considered as a reaction precursor to create a usable phosphate ester.

The first component may include one or more additives. The one or more additives may include one or more of a bisphenol A, butadiene-acrylic copolymer mixture, calcium carbonate, minerals, reinforcing fiber, hydrophobic silica, a monomer, tabular alumina, or any combination thereof. The system may include calcium carbonate present in an amount from about 0.5% to about 20% by weight. The system may include an ultrafine calcium carbonate, a fine calcium carbonate, a medium fine calcium carbonate, or any combination thereof. The first component may include fine calcium carbonate in an amount from about 0.5% to about 15% by weight. The first component may include medium fine calcium carbonate in an amount from about 1% to about 20% by weight. The first component may include ultrafine calcium carbonate in an amount from about 0.1% to about 5% by weight. The first component may include medium fine calcium carbonate in an amount from about 1% to about 10% by weight.

The second component may include one or more additives. The one or more additives of the second component may include one or more of tabular alumina, reinforcing fiber, hydrophobic silica, minerals, a monomer, phosphoric acid, or any combination thereof. The one or more epoxy resins or epoxy functionalized resins may include one or more liquid epoxy resins, one or more epoxy phenol novolac resins, one or more aliphatic multifunctional epoxy resins, one or more phenoxy resins, one or more silane modified epoxy resins, or any combination thereof.

The system may include one or more liquid epoxy resins including a reaction product of epichlorohydrin and bisphenol A; a reaction product of epichlorohydrin and bisphenol F; or both. The system may include one or more epoxy phenol novolac resins including a formaldehyde oligomeric reaction product with 1-chloro-2,3-epoxypropane and phenol; a poly[(phenyl glycidyl ether)-co-formaldehyde]; or both. The system may include one or more epoxy phenol novolac resins include an epoxy phenol novolac resin with a functionality from about 2 to about 3; an epoxy phenol novolac resin with a functionality from about 3 to about 4; or both. The system may include one or more aliphatic multifunctional epoxy resins including an epoxidized sorbitol. The system may include one or more liquid epoxy resins present in an amount from about 2% to about 40% by weight. The system may include one or more epoxy phenol novolac resins present in an amount from about 30% to about 50% by weight. The system may include one or more aliphatic multifunctional epoxy resins present in an amount from about 5% to about 35% by weight. The system may include one or more phenoxy resins present in an amount from about 0.1% to about 12% by weight. The system may include one or more silane modified epoxy resins present in an amount from about 1% to about 10% by weight.

The composition may work effectively at a temperature of from about 0° C. to about 50° C. The composition may cure at a temperature of about 15° C. to about 25° C. The composition may have a cure time of from about 1 minute to about 30 minutes. The composition may have a cure time of from about 7 minutes to about 10 minutes. The composition may undergo a volume expansion of from about 10% to about 500%. The composition may undergo a volume expansion from about 50% to about 100%.

The composition may be dispensed on a desirable assembly. The composition may be dispensed in a cavity. The two-part system may be substantially free of latent curing agents, curing accelerators, or both.

The teachings herein further provide for a two-part system comprising a first component including one or more first component additives and at least one epoxy resin or epoxy-functional resin selected from: one or more liquid epoxy resins, one or more epoxy phenol novolac resins; one or more aliphatic multifunctional epoxy resin; one or more phenoxy resins; one or more silane modified epoxy resins, or any combination thereof; and a second component including a first phosphate ester, an optional second phosphate ester, an optional third phosphate ester, and one or more second component additives. Upon mixing the first component and second component to form a composition, the composition may cure at a temperature of about 0° C. to about 50° C.

The first phosphate ester may be a phosphate ester derived from 2-ethylhexyl glycidyl ether. The second phosphate ester may be a phosphate ester derived from cashew nutshell liquid (CNSL), a phosphate ester derived from an epoxidized para-tertiary butyl phenol, a nonyl phenol ethoxylated phosphate ester, or a combination thereof. The system may include the third phosphate ester which may be derived from a phenyl glycidyl ether. The composition may have some added phosphoric acid.

The one or more first component additives may include core-shell polymer, calcium carbonate, minerals, a monomer, reinforcing fiber, hydrophobic silica, tabular alumina, or any combination thereof. The calcium carbonate may include an ultrafine calcium carbonate, a fine calcium carbonate, a medium fine calcium carbonate, or any combination thereof. The first component may include fine calcium carbonate in an amount from about 4% to about 6% by weight. The first component may include medium fine calcium carbonate in an amount from about 4% to about 6% by weight. The first component may include ultrafine calcium carbonate in an amount from about 0.1% to about 2% by weight. The first component may include medium fine calcium carbonate in an amount from about 1% to about 3% by weight. The one or more second component additives may include tabular alumina, reinforcing fiber, hydrophobic silica, minerals, a monomer, phosphoric acid, or any combination thereof.

The one or more liquid epoxy resins may include a reaction product of epichlorohydrin and bisphenol A; a reaction product of epichlorohydrin and bisphenol F; or both. The one or more liquid epoxy resins may be present in an amount from about 4% to about 15% by weight. The one or more epoxy phenol novolac resins may include a formaldehyde oligomeric reaction product with 1-chloro-2,3-epoxypropane and phenol; a poly[(phenyl glycidyl ether)-co-formaldehyde]; or both. The one or more epoxy phenol novolac resins may include an epoxy phenol novolac resin with a functionality from about 2 to about 3; an epoxy phenol novolac resin with a functionality from about 3 to about 4; or both. The one or more epoxy phenol novolac resins may be present in an amount from about 30% to about 50% by weight. The one or more aliphatic multifunctional epoxy resins may include an epoxidized sorbitol. The one or more aliphatic multifunctional epoxy resins may be present in an amount from about 10% to about 22% by weight. The one or more phenoxy resins may be present in an amount from about 7% to about 12% by weight. The one or more silane modified epoxy resins may be present in an amount from about 2% to about 6% by weight.

The teachings herein are also directed to a method comprising providing a two-part system, the two-part system including a first component and a second component, the first component including one or more epoxy resins or epoxy functional resins, and the second component including one or more phosphate esters, and mixing the first component and the second component to form a composition. The composition may cure at a temperature of from about 0° C. to about 50° C.

The second component may include at least one phosphate ester. The method may include curing the composition to complete cure in about 5 minutes to about 30 minutes. The method may include curing the composition to complete cure in about 7 minutes to about 10 minutes. The method may include expanding the composition to a volume expansion from about 10% to about 200%. The method may include expanding the composition to a volume expansion of at least about 50% to about 100%.

The method may include dispensing the curable composition onto a desirable assembly or in a cavity. The method may include forming a composition that is substantially free of latent curing agents, curing accelerators, or both.

DETAILED DESCRIPTION

The present teachings meet one or more of the above needs by the improved compositions and methods described herein. The explanations and illustrations presented herein are intended to acquaint others skilled in the art with the teachings, its principles, and its practical application. Those skilled in the art may adapt and apply the teachings in its numerous forms, as may be best suited to the requirements of a particular use. Accordingly, the specific embodiments of the present teachings as set forth are not intended as being exhaustive or limiting of the teachings. The scope of the teachings should, therefore, be determined not with reference to the above description, but should instead be determined with reference to the appended claims, along with the full scope of equivalents to which such claims are entitled. The disclosures of all articles and references, including patent applications and publications, are incorporated by reference for all purposes. Other combinations are also possible as will be gleaned from the following claims, which are also hereby incorporated by reference into this written description.

The application claims the benefit of the filing date of U.S. Provisional Application Ser. No. 62/828,691, filed Apr. 3, 2019, the contents of that application being incorporated by reference herein for all purposes.

The present teachings provide a composition, that may be a two-part composition comprising an A-side (i.e., "first component") and a B-side (i.e., "second component"). Upon mixing, the two-part composition may form a curable composition and the reaction product, when fully cured, may be a rigid foamed material.

The A-side may comprise one or more epoxy resins, one or more additives, one or more monomers, or any combination thereof. The one or more epoxy resins may include one or more liquid epoxy resins, one or more flexible epoxy resins, one or more epoxy phenol novolac resins, one or more aliphatic multifunctional epoxy resins, one or more reactive diluents, one or more phenoxy resins, one or more silane modified epoxy resins, one or more monomers, or any combination thereof. The one or more additives may include one or more toughening agents (e.g., core-shell polymer), calcium carbonate, minerals, reinforcing fibers or other reinforcing particulates, hydrophobic silica, tabular alumina, or any combination thereof.

The B-side may comprise one or more phosphate esters, phosphoric acid, one or more additives, one or more monomers, or any combination thereof. The one or more phosphate esters may include a first phosphate ester, a second phosphate ester, a third phosphate ester, or any combination thereof. The one or more additives may include one or more toughening agents (e.g., core-shell polymer), minerals, reinforcing fibers or other reinforcing particulates, hydrophobic silica, tabular alumina, or any combination thereof.

The one or more phosphate esters may be one or more customized phosphate esters. The one or more customized phosphate esters may be produced by the reaction of phosphoric acid and various alcohols. The one or more customized phosphate esters may be produced by the reaction of phosphoric acid and an epoxide group of a phosphate ester precursor (i.e., component not yet reacted with phosphoric acid). The one or more customized phosphate esters may be produced by the reaction of phosphoric acid with the glycidyl ether of cashew nutshell liquid (CNSL) such as that sold under the trade name Cardolite® LITE 2513HP, commercially available from Cardolite Corporation, Monmouth Junction NJ. The one or more customized phosphate esters may be produced by the reaction of phosphoric acid with a phenyl glycidyl ether such as that sold under the trade name ERISYS® GE-13, commercially available from CVC Thermoset Specialties, Moorestown, NJ The one or more customized phosphate esters may be produced by the reaction of phosphoric acid with 2-ethylhexyl glycidyl ether such as that sold under the trade name ERISYS® GE-6, commercially available from CVC Thermoset Specialties, Moorestown, NJ The one or more customized phosphate esters may be produced by the reaction of phosphoric acid with an epoxidized para-tertiary butyl phenol such as that sold under the trade name ERISYS® GE-11, commercially available from CVC Thermoset Specialties, Moorestown, NJ.

The one or more phosphate esters may be one or more commercially pre-reacted phosphate esters. The one or more commercially pre-reacted phosphate esters, when swapped into the B-side in place of a customized phosphate ester may result in a curable composition that is slower reacting and foaming presumably due to a lower amount of free phosphoric acid. Reacting and foaming of the one or more commercially pre-reacted phosphate esters may be improved (i.e., sped up) by the addition of phosphoric acid in the B-side. The one or more commercially pre-reacted phosphate esters may have a pH of about 1 to 3 in aqueous solution. The one or more commercially pre-reacted phosphate esters may have a viscosity of about 32,500 cP to about 42,500 cP at 25° C. as measured according to ASTM D445. The one or more commercially pre-reacted phosphate esters may be a nonyl phenol ethoxylated phosphate ester. Examples of suitable commercially pre-reacted phosphate esters may be those sold under the trade names of Dextrol™ OC-110, Dextrol OC-40, and Strodex MO-100 commercially available from Ashland, Inc. (Covington, KY).

The commercially pre-reacted phosphate esters may be present in the B-side. The one or more commercially pre-reacted phosphate esters may be present in an amount of about 6% to about 18% by weight of the B-side. The one or more commercially pre-reacted phosphate esters may be present in an amount of about 8% to about 16% by weight of the B-side. The one or more commercially pre-reacted phosphate esters may be present in an amount of about 10% to about 14% by weight of the B-side. The one or more commercially pre-reacted phosphate esters may be present in an amount of about 12% by weight of the B-side.

The one or more phosphate esters may be produced by a reaction of a range of stoichiometric ratios of phosphate ester precursors to phosphoric acid. The one or more phosphate esters may be produced by a reaction of about 0.7:1 phosphate ester precursor to phosphoric acid to about 1:0.7 phosphate ester precursor to phosphoric acid. The one or more phosphate esters may be produced by a reaction of about 0.8:1 phosphate ester precursor to phosphoric acid to about 1:0.8 phosphate ester precursor to phosphoric acid. The one or more phosphate esters may be produced by a reaction of about 0.9:1 phosphate ester precursor to phosphoric acid to about 1:0.9 phosphate ester precursor to phosphoric acid. The one or more phosphate esters may be produced by a reaction of about 1:1 phosphate ester precursor to phosphoric acid. The one or more phosphate esters may be produced by a reaction of about 0.8:1 phosphate ester precursor to phosphoric acid.

The cashew nutshell liquid (CNSL) may include chemicals commonly extracted from cashew nutshell liquid (CNSL) including anacardic acids, cardol, cardanol, or any combination thereof. Preferably, the glycidyl ether of the cashew nutshell liquid (CNSL) is a glycidyl ether of cardanol.

The one or more phosphate esters may be selected from mono-esters, di-esters, or tri-esters as shown below:

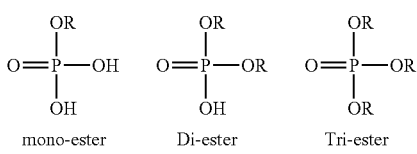

The one or more phosphate esters may be obtained from the reaction of epoxide groups with phosphoric acid as depicted below:

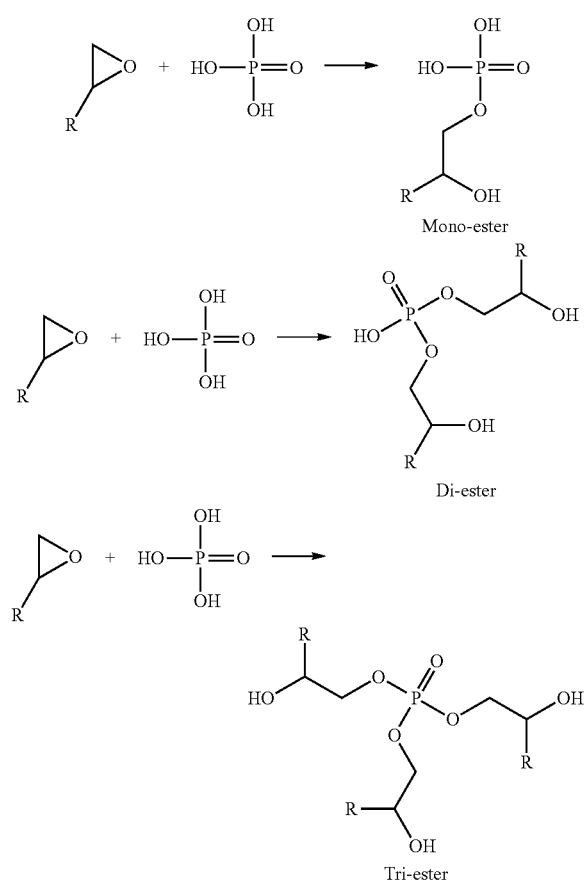

The B-side may comprise one or more phosphate esters, one or more phosphate ester precursors, or both. The B-side may comprise one or more phosphate ester precursors that may be combined with phosphoric acid prior to combination with the A-side. The B-side may comprise one or more phosphate esters that are pre-reacted (i.e., the epoxide and phosphate reaction) before addition to the B-side.

The first phosphate ester may be a reaction product of phosphoric acid with 2-ethylhexyl glycidyl ether. The second phosphate ester may be a reaction product of an epoxidized para-tertiary butyl phenol, a reaction product of a glycidyl ether of cashew nutshell liquid (CNSL), a nonyl phenol ethoxylated phosphate ester, or a combination thereof. The third phosphate ester may be a reaction product of phosphoric acid with a phenyl glycidyl ether. The B-side may include the first phosphate ester, the second phosphate ester, the third phosphate ester, or a combination thereof.

The first phosphate ester may be present in an amount from about 1% to about 70% by weight of the B-side. The first phosphate ester may be present in an amount from about 5% to about 60% by weight of the B-side. The first phosphate ester may be present in an amount from about 10% to about 30% by weight of the B-side. The second phosphate ester, if present, may be present in an amount from about 1% to about 80% by weight of the B-side. The second phosphate ester may be present in an amount from about 3% to about 50% by weight of the B-side. The second phosphate ester may be present in an amount from about 5% to about 40% by weight of the B-side. The third phosphate ester, if present, may be present in an amount from about 0.5% to about 90% by weight of the B-side. The third phosphate ester may be present in an amount from about 10% to about 70% by weight of the B-side. The third phosphate ester may be present in an amount of about 20% to about 65% by weight of the B-side.

The B-side may include phosphoric acid. The phosphoric acid may be ortho-phosphoric acid, polyphosphoric acid, or both. The phosphoric acid may be polyphosphoric acid. The phosphoric acid may be free acid in the one or more phosphate esters, added independently from the one or more phosphate esters, or both. The addition of phosphoric acid to the B-side may result in increased expansion (e.g., foaming) of the resulting reaction product. The addition of phosphoric acid to the B-side may increase the reactivity of the two-part system to help maintain desired levels of expansion, curing, or both when temperatures are below 23° C.

The independently added phosphoric acid, if present, may be in aqueous solution in the amount of 85% or more, or even 95% or more (i.e., "reagent grade"). The independently added phosphoric acid may be present in an amount from about 0.1% to about 30% by weight of the B-side. The independently added phosphoric acid may be present in an amount from about 2% to about 6% by weight of the B-side. The independently added phosphoric acid may be present in an amount of about 4% by weight of the B-side.

The one or more phosphate esters produced from the reaction of phosphoric acid and one or more epoxide group containing components, may include free acid. The one or more phosphate esters may have about 1% or more free acid, about 3% or more free acid, about 5% or more free acid, about 15% or less free acid, about 13% or less free acid, or even about 11% or less free acid.

The two-component system, upon addition of the A-side and the B-side, may foam as a result of a reaction of metal carbonate or metal bicarbonate and an acid, generating the release of gas (e.g., carbon dioxide) to serve as chemical blowing agent. Such a reaction mechanism is described in U.S. Pat. No. 5,648,401, incorporated by reference herein for all purposes.

The curing, foaming, or both may occur at a temperature of about 50° C. or less, 40° C. or less, about 30° C. or less, about 20° C. or less, or about 0° C. or less. The curing, foaming, or both may occur at a temperature of about 0° C. or more, about 10° C. or more, or even about 20° C. or more. The curing, foaming, or both may occur at a temperature from about 10° C. to about 50° C., or even more. The curing, foaming, or both may occur at a temperature of about 10° C. The curing, foaming, or both may occur at room temperature (e.g. at a temperature of about 15° C. to about 25° C.). The curing, foaming, or both may occur at a temperature of about 23° C. The curing and foaming may occur at different temperatures or at substantially the same temperature.

The present teachings contemplate a relatively fast curing time, foaming time, or both as compared to other cure agents or cure systems that occur without the addition of a stimulus (e.g., at room temperature). The cure time of the reaction product may be 75 minutes or less, 50 minutes or less, 30 minutes or less, 20 minutes or less, 2 minutes or more, 8 minutes or more, or even 16 minutes or more. The cure time of the resulting reaction product may be from about 5 minutes to about 20 minutes. The cure time of the resulting reaction product may be about 10 minutes. The cure time of the resulting reaction product may be about 7 minutes. The cure time of the resulting reaction product may be about 5 minutes. The curing and foaming may occur at different times or at substantially the same time.

Foaming may begin before complete cure of the resulting reaction product. The foaming time (i.e., the time frame within which the two-part system actively foams) of the reaction product may be 30 minutes or less or even 20 minutes or less. The foaming time of the reaction product may be from about 1 minute to about 10 minutes. The foaming time of the reaction product may be about 5 minutes. The foaming time of the reaction product may be about 7 minutes.

The A-side may include one or more epoxy-based materials (i.e., one or more epoxy resins). The one or more epoxy resins may be any conventional dimeric, oligomeric, or polymeric epoxy resin. The one or more epoxy resins may contain at least one epoxide functional group (i.e., monofunctional) or may contain more than one epoxide functional group (i.e., multifunctional). The one or more epoxy resins may contain one or more epoxide functional group, two or more epoxide functional groups, three or more epoxide functional groups, or even four or more epoxide functional groups. The one or more epoxy resins may be modified epoxy resins (e.g., silane modified, elastomer modified, and the like). The one or more epoxy resins may be aliphatic, cycloaliphatic, aromatic, or the like, or any combination thereof. The one or more epoxy resins may be supplied as a solid (e.g., as pellets, chunks, pieces, or the like, or any combination thereof) or a liquid (e.g., a liquid epoxy resin). As used herein, unless otherwise stated, an epoxy resin is a solid if it is solid at a temperature of 23° C. and is a liquid resin if it a liquid at a temperature of 23° C. The one or more epoxy resins may include one or more liquid epoxy resins, one or more flexible epoxy resins, one or more epoxy phenol novolac resins, one or more aliphatic multifunctional epoxy resins, one or more reactive diluents, one or more phenoxy resins, one or more silane modified epoxy resins, or any combination thereof.

The two-part system may include one or more liquid epoxy resins. The liquid epoxy resin may function as a base for the epoxy resin component. The liquid epoxy resin may be a reaction product of epichlorohydrin (hereinafter, "EPH") and any conventional bisphenol. The liquid epoxy resin may be a reaction product of EPH and bisphenol A (hereinafter, "BPA"), bisphenol F (hereinafter, "BPF"), or both. The liquid epoxy resin may have an epoxide equivalent weight (hereinafter "EEW") from about 160 g/equivalent to about 192 g/equivalent as measured according to ASTM D1652-97. The liquid epoxy resin may have an epoxide percentage from about 20 to about 25. The liquid epoxy resin may have a viscosity from about 2,000 cP to about 14,000 cP at 25° C. as measured according to ASTM D445. An example of a suitable BPA-based liquid epoxy resin may be D.E.R.™ 331, commercially available from The Olin Corporation (Clayton, MO). An example of a suitable BPF-based liquid epoxy resin may be YDF-170 commercially available from Kukdo Chemical (South Korea).

The liquid epoxy resin may be present as a part of the A-side. The liquid epoxy resin may be present in an amount of from about 4% to about 70% by weight of the A-side. The liquid epoxy resin may be present in an amount of from about 6% to about 10% by weight of the A-side. The liquid epoxy resin may be present in an amount of about 8% by weight of the A-side.

The two-part system may include one or more flexible epoxy resins. The one or more flexible epoxy resins may function to reduce the compression modulus, increase strain to failure, decrease time to recover, decrease the degree of cross-linking density, increase impact resistance, improve adhesion, improve peel resistance, or any combination thereof, of the reaction product. The one or more flexible epoxy resins may improve the gas entrapment capability of the two-part system impart by acting as a viscosity modifier. The one or more flexible epoxy resin may be a di-functional glycidyl ether epoxy resin, an unmodified BPA-based epoxy resin, a multifunctional epoxidized polybutadiene resin, or any combination thereof. The one or more flexible epoxy resins may have an EEW of about 260 to about 500 as measured according to ASTM D1652-97. The one or more flexible epoxy resins may have a viscosity of about 700 cP to about 25,000 cP at 25° C. as measured according to ASTM D445. Examples of suitable flexible epoxy resins may include NC-514 (commercially available from Cardolite Corporation, Monmouth Junction NJ), Araldite® PY 4122 (commercially available from Huntsman Advanced Materials, Inc., Salt Lake City, UT), Poly Bd® 605E (commercially available from Cray Valley, Exton, PA), or any combination thereof.

The one or more flexible epoxy resins may be present in the A-side. The one or more flexible epoxy resins may be present in an amount from about 0.5% to about 40% by weight of the A-side. The one or more flexible epoxy resins may be present in an amount from about 35% to about 45% by weight of the A-side. The one or more flexible epoxy resins may be present in an amount of about 39% by weight of the A-side. The one or more flexible epoxy resins may include a di-functional glycidyl ether epoxy resin in the amount of from about 10% to about 18% by weight of the A-side, an unmodified BPA-based epoxy resin in an amount from about 8% to about 16% by weight of the A-side, and a multifunctional epoxidized polybutadiene resin in an amount from about 8% to about 16% by weight of the A-side. The one or more flexible epoxy resins may include a di-functional glycidyl ether epoxy resin in the amount of about 5% to 20% by weight of the A-side, an unmodified BPA-based epoxy resin in an amount of about 5% to about 20% by weight of the A-side, and a multifunctional epoxidized polybutadiene resin in an amount of about 5% to about 20% by weight of the A-side. The two-component system may include a di-functional glycidyl ether epoxy resin, a difunctional epoxy derived from cardanol, and a multifunctional epoxidized polybutadiene resin, respectfully in a ratio of about 1:1:1. The two-component system may include a di-functional glycidyl ether epoxy resin, a difunctional epoxy derived from cardanol, and a multifunctional epoxidized polybutadiene resin. The aforementioned resins may be present in a ratio of about 1:0.8:0.8, respectively. The two-component system may include a di-functional glycidyl ether epoxy resin, a difunctional epoxy derived from cardanol, and a multifunctional epoxidized polybutadiene resin. The aforementioned resins may be present in a ratio of about 1:0.9:0.9, respectfully.

The two-part system described herein may also include one or more epoxy phenol novolac resins. The one or more epoxy phenol novolac resins may function to impart chemical resistance, solvent resistance, temperature resistance, or any combination thereof, to the reaction product. The one or more epoxy phenol novolac resins may be present as a part of the A-side. The one or more epoxy phenol novolac resins may have an EEW from about 165 g/equivalent to about 183 g/equivalent as measured according to ASTM D1652-97. The one or more epoxy phenol novolac resins may have an average epoxy functionality from about 2.1 to about 6.5. The one or more epoxy phenol novolac resins may have a viscosity from about 18,000 cP to about 30,000 cP at 25° C.

as measured according to ASTM D445. Examples of suitable epoxy phenol novolac resins may be those sold under the trade names Epalloy® 8250 (formaldehyde, oligomeric reaction products with 1-chloro-2,3-epoxypropane and phenol; 2.6 functionality) and Epalloy® 8330 (Poly[(phenyl glycidyl ether)-co-formaldehyde]; 3.6 functionality), commercially available from CVC Thermoset Specialties (Moorestown, NJ).

The one or more epoxy phenol novolac resin may be present in an amount from about 10% to about 60% by weight of the A-side. The one or more epoxy phenol novolac resins may be present in an amount of about 35% to about 45% by weight of the first component or A-side. The one or more epoxy phenol novolac resins may be present in an amount of about 38% to about 42% by weight of the A-side. The one or more epoxy phenol novolac resins may be present in an amount of about 42% by weight of the A-side. The one or more epoxy phenol novolac resins may include an about 3.6 functional epoxy phenol novolac resin present in an amount of from about 0.1% to about 50% by weight of the A-side and an about 6.5 functional epoxy novolac resin present in an amount of from about 22% to about 32% by weight of the A-side. The one or more epoxy phenol novolac resins may include an about 3.6 functional epoxy phenol novolac resin present in an amount of about 15% by weight of the A-side and an about 6.5 functional epoxy novolac resin present in an amount of about 28% by weight of the A-side. The two-part system may include an about 3.6 functional epoxy phenol novolac resin and an about 6.5 functional epoxy phenol novolac resin at a ratio of about 1:2 to about 1:3.

The two-part system may include one or more aliphatic multifunctional epoxy resins. The one or more aliphatic multifunctional epoxy resins may function to increase the degree of cross-linking of the reaction product, increase the chemical resistance of the reaction product, or both. The one or more aliphatic multifunctional epoxy resins may include an epoxidized sorbitol. The one or more aliphatic multifunctional epoxy resins may have an EEW from about 160 g/equivalent to about 195 g/equivalent as measured according to ASTM D1652-97. The one or more aliphatic multifunctional epoxy resins may have a viscosity from about 4,000 cP to about 18,000 cP at 25° C. as measured according to ASTM D445. Examples of suitable aliphatic multifunctional epoxy resins may be those sold under the trade names ERISYS® GE-60 and ERISYS® GE-61, commercially available from CVC Thermoset Specialties (Moorestown, NJ).

The one or more aliphatic multifunctional epoxy resins may be present as a part of the A-side. The one or more aliphatic multifunctional epoxy resins may be present in an amount from about 4% to about 60% by weight of the A-side. The one or more aliphatic multifunctional epoxy resins may be present in an amount from about 10% to about 22% by weight of the A-side. The one or more aliphatic multifunctional epoxy resins may be present in an amount of about 20% by weight of the A-side. The one or more aliphatic multifunctional epoxy resins may be present in an amount of about 13% by weight of the A-side.

The two-part system may include one or more reactive diluents. The one or more reactive diluents may function to reduce the overall viscosity of the two-part system, in order to modify the dispensing process or the flow of the two-part system on a workpiece after dispensing, increase the degree of cross-linking of the reaction product, for multi-functional diluents or both. The one or more reactive diluents may be polymeric, whereby the reactive diluent may increase the flexibility of the reaction product; the one or more reactive diluents may be multifunctional, whereby the reactive diluent may promote increased crosslinking and impart chemical resistance on the reaction product; or both. The one or more reactive diluents may include a polyglycol diglycidyl ether, a trimethylolethane triglycidyl either, or both. The one or more reactive diluents may have an EEW from about 150 g/equivalent to about 170 g/equivalent as measured according to ASTM D1652-97. The one or more reactive diluents may have a viscosity of about 200 cP to about 300 cP at 25° C. as measured according to ASTM D445. An example of a suitable reactive diluents may be those sold under the trade names ERISYS® GE-31 and ERISYS® GE-24, commercially available from CVC Thermoset Specialties (Moorestown, NJ).

The one or more reactive diluents may be present in an amount from about 5% to about 20% by weight of the A-side. The one or more reactive diluents may be present in an amount from about 8% to about 16% by weight of the A-side. The one or more reactive diluents may be present in an amount from about 10% to about 14% by weight of the A-side. The one or more reactive diluents may be present in an amount of about 13% by weight of the A-side. The one or more reactive diluents may include a polyglycol diglycidyl ether present in an amount from about 2% to about 6% by weight of the A-side, and a trimethylolethane triglycidyl either present in an amount from about 6% to about 14% of the A-side. The one or more reactive diluents may include a polyglycol diglycidyl ether present in an amount of about 4% by weight of the A-side, and a trimethylolethane triglycidyl either present in an amount of about 9% of the A-side. The two-part system may include a polyglycol diglycidyl ether and a trimethylolethane triglycidyl ether respectively at a ratio of about 1:2 to about 1:3.

The two-part system may include one or more phenoxy resins (i.e., polyhydroxy ether). The one or more phenoxy resins may function to impart improved adhesion, corrosion resistance, heat resistance, or any combination thereof to the reaction product. The one or more phenoxy resins may be derived from the reaction of BPA and EPH. The one or more phenoxy resins may have terminal hydroxyl groups as well as hydroxyl groups in every repeating polymeric unit. The one or more phenoxy resins may have an EEW from about 202 g/equivalent to about 214 g/equivalent as measured according to ASTM D1652-97. The one or more phenoxy resins may have a viscosity from about 20,000 cP to about 50,000 cP at 25° C. as measured according to ASTM D445. An example of a suitable phenoxy resin may be Phenoxy LER-HB commercially available from Gabriel Chemical (Akron, OH).

The one or more phenoxy resins may be present in an amount from about 1% to about 20% by weight of the A-side. The one or more phenoxy resins may be present in an amount from about 7% to about 12% by weight of the A-side. The one or more phenoxy resins may be present in an amount of about 10% by weight of the A-side.

The two-part system may include one or more silane modified epoxy resins. The one or more silane modified epoxy resins may function to impart improved adhesion to the reaction product, particularly adhesion to glass, metals, or both. An example of a suitable silane modified epoxy resin may be that sold under the trade name EPOKUKDO® KSR-177 commercially available from Kukdo Chemical (South Korea). The silane modified epoxy may be a linear-difunctional silicone pre-polymer terminated with a cyclic epoxide (e.g., a pre-polymer with cycloaliphatic epoxide group). Another suitable material would be a silicone pre-polymer with cycloaliphatic epoxide groups. An example of one such material is available under the trade name Silmer EPC Di-50, available from Siltech Corporation in Ontario, Canada.

The one or more silane modified epoxy resins may be present in the A-side. The one or more silane modified epoxy resins may be present in an amount of about 1% to about 7% by weight of the A-side. The one or more silane modified epoxy resins may be present in an amount of about 2% to about 6% by weight of the A-side. The one or more silane modified epoxy resins may be present in an amount of about 4% by weight of the A-side.

The two-part system may include one or more monomers. The one or more monomers may function to improve adhesion properties of the reaction product, particularly to metal substrates, increase flexibility of the reaction product, increase impact resistance of the reaction product, or any combination thereof. The one or more monomers may be monofunctional, bifunctional, or even polyfunctional. The one or monomers may be an esterification reaction product of an alcohol and acrylic acid or methacrylic acid. The one or more monomers may be a monofunctional acrylic monomer. Preferably, the one or more monomers may be a mixture of methacrylate acid ester and 2-(2-ethoxyethoxy) ethyl acrylate. An example of a suitable monomer may be that sold under the trade name SR 9050 commercially available from Sartomer (Exton, PA).

The two-part system may include one or more monomers in the A-side, the B-side, or both. The one or more monomers may be present in an amount of about 0.5% to about 26% by weight of the A-side, B-side, or both the A-side and B-side in combination. The one or more monomers may be present in an amount of about 12% to about 24% by weight of the A-side, B-side, or both the A-side and B-side in combination. The one or more monomers may be present in an amount of about 14% to about 22% by weight of the A-side, B-side, or both the A-side and B-side in combination. The one or more monomers may be present in an amount of about 18% by weight of the A-side, B-side, or both the A-side and B-side in combination.

The rate of cure, the degree of crosslinking, or both may be a function of the functionality of the two-part system (A-side and B-side). A higher functionality (i.e., number of functional groups on one or more polymerizable components) may be desired for a two-part system having pre-polymerized components that are shorter in polymer length (i.e., lower viscosity); whereby the lack of structural backbone resulting from shorter polymers is compensated by a higher degree of crosslinking. A lower functionality may be desired for a two-part system having pre-polymerized components that are longer in length (i.e., higher viscosity); whereby the presence of more structural backbone resulting from longer polymers precludes the need for high functionality.

The B-side functionality may at least partially be reduced by the reaction of metal carbonate in the A side with phosphoric acid and the phosphate esters. As a result, the functionality of the B-side may be reduced in the in-situ reaction mixture. The A-side may include components with increased functionality in order to compensate for a reduced functionality of the B-side. The A-side may be formulated with increased functionality by using reactive ingredients with functionality higher than two.

The two-part system may include one or more additives. The one or more additives may include one or more toughening agents, calcium carbonate, minerals, reinforcing fibers or other reinforcing particulates, hydrophobic silica, tabular alumina, or any combination thereof.

The two-part system may include one or more toughening agents. The one or more toughening agents may function to distribute energy within the reaction product (i.e., increase impact resistance). The one or more toughening agents may contribute to an increased T-Peel strength. The one or more toughening agents may comprise thermoplastics, thermosets or thermosettables, elastomers, the like, or any combination thereof. The one or more toughening agents may include elastomers (including elastomer containing materials), core-shell polymers (which may include but are not limited to elastomers), or both.

The core-shell polymers, if present, may comprise a first polymeric material (i.e., core material) and a second polymeric material (i.e., shell material). The first polymeric material may be entirely encapsulated by the second polymeric material. The core-shell polymer may include a first polymeric material in the amount of about 30% or more, 50% or more, or even 70% or more by weight. The first polymeric material, the second polymeric material, or both may comprise one, two, three, or even more than three polymers that are combined together, reacted together (e.g., sequentially polymerized), or both, or may be part of separate or the same core-shell polymer systems. An example of a suitable core-shell polymer may be that sold under the trade name Kane Ace® MX-267 and MX-257 commercially available from Kaneka North America LLC (Pasadena, TX).

The core-shell polymers may be present in an amount from about 1% to about 25% by weight of the A-side, B-side, or both the A-side and B-side in combination (e.g., if present in the amount of 10% by weight then it may be present in an amount of 5% in the A-side and 5% in the B-side). The core-shell polymer may be present in an amount from about 5% to about 20% by weight of the A-side, B-side, or both the A-side and B-side in combination. The core-shell polymer may be present in an amount of about 5% by weight of the A-side, B-side, or both the A-side and B-side in combination. The core-shell polymer may be present in an amount of about 17% by weight of the A-side, B-side, or both the A-side and B-side in combination.

The two-part system may include one or more metal carbonates. The one or more metal carbonates may function to produce gas in the presence of an acid, act as a filler, delay cure activity, control the onset or total extent of the foaming (e.g., expansion) process, or both. The one or more metal carbonates may be metal carbonate or metal bicarbonate. Examples of suitable metal carbonates may include calcium carbonate, nickel carbonate, barium carbonate, sodium bicarbonate, potassium bicarbonate, and combinations thereof. Preferably the one or more metal carbonates may include calcium carbonate. The particle size of the metal carbonate, metal bicarbonate, or both may control the expansion and cure of the two-part system, whereby the total surface area of metal carbonate, metal bicarbonate, or both, available to react with the acid is a function of both the particle size of the metal carbonate, bicarbonate, or both, and the amount present in the two-part system.

The calcium carbonate ($CaCO_3$) may be present as one or more calcium carbonate fillers. The one or more calcium carbonate fillers may have a median particle size of from about 1 to about 50 microns. The calcium carbonate may be a medium fine particle size. For example, the median particle size of the medium fine calcium carbonate may be about 22 microns. An example of a suitable medium fine calcium carbonate may be Hubercarb® Q200, commercially available from Huber Engineered Materials, Atlanta, GA.

The calcium carbonate may be a fine particle size. For example, the median particle size of the fine calcium carbonate may be about 4 microns. An example of a suitable fine calcium carbonate may be Hubercarb® Q4, commercially available from Huber Engineered Materials, Atlanta, GA. The calcium carbonate may be ultra-fine particle size. For example, the median particle size of the ultra-fine calcium carbonate may be about 1 micron. An example of a suitable ultra-fine calcium carbonate may be Hubercarb® Q1, commercially available from Huber Engineered Materials, Atlanta, GA. The two-part system may include medium fine calcium carbonate, fine calcium carbonate, ultra-fine calcium carbonate, or any combination thereof.

The calcium carbonate may be present in an amount from about 1% to about 40% by weight of the A-side. The calcium carbonate may be present in an amount from about 2% to about 12% by weight of the A-side. The calcium carbonate may be present in an amount of about 2% by weight of the A-side. The calcium carbonate may be present in an amount of about 8% by weight of the A-side. The calcium carbonate may be present in an amount of about 10% by weight of the A-side. The calcium carbonate may include an ultra-fine calcium carbonate present in an amount from about 0.5% by weight to about 5% by weight of the A-side; a fine calcium carbonate present in an amount from about 0.5% by weight to about 7% by weight of the A-side; a medium fine ground calcium carbonate present in an amount from about 0.5% to about 7% by weight of the A-side; or a combination thereof. A ratio of a medium fine calcium carbonate to a fine calcium carbonate may be about 3:1 to about 1:3. A ratio of medium fine calcium carbonate to a fine calcium carbonate may be about 1:1. A ratio of medium fine calcium carbonate to an ultrafine calcium carbonate may be about 3:1 to about 1:3. A ratio of medium fine calcium carbonate to an ultrafine calcium carbonate may be about 1:1.

The calcium carbonate may include a coating. The coating may be any material that breaks down during the activation process, expansion process, or both, so that expansion is delayed, slowed, or both. The coating may be a wax, a fatty acid, or combinations thereof.

The two-part system may include one or more minerals. The one or more minerals (i.e., "mineral reinforcement") may function to structurally reinforce the reaction product. The one or more minerals may improve tensile strength, the flexural strength, or both of the reaction product. The one or more minerals may be any suitable silicate minerals including but not limited to inosilicates (e.g., Wollastonite) and phyllosilicates (e.g., Kaolinite, Vermiculite, Talc, Muscovite, etc.). The characteristic external shape of an individual crystal or crystal group of the one or more minerals may be acicular or needle-like. The median particle size of the one or more minerals may be from about 10 microns to about 20 microns. The median particle size may be from about 12 microns to about 18 microns.

The one or more minerals may include Wollastonite (CaSiO$_3$). The Wollastonite may be relatively pure (i.e., less than 2% by weight of impurities such as other metal oxides). The Wollastonite may contain impurities including one or more oxides of iron, magnesium, manganese, aluminum, potassium, sodium, or strontium substituting for calcium in the mineral structure. Examples of suitable Wollastonite may be that sold under the trade names NYGLOS® 12 and NYGLOS® 8 commercially available from NYCO Minerals Inc. (Willsboro, NY).

The one or more minerals may be present as part of the A-side, the B-side, or both. The Wollastonite may be present in an amount from about 1% to about 18% by weight of the A-side, B-side, or both the A-side and B-side in combination. The Wollastonite may be present in an amount from about 3% to about 7% by weight of the A-side, B-side, or both the A-side and B-side in combination. The Wollastonite may be present in an amount of about 4% by weight of the A-side, B-side, or both the A-side and B-side in combination.

The one or more minerals may be modified. For example, the one or more minerals may include Kaolinite (i.e., "kaolin clay") that has been calcined (i.e., fired at high temperatures in order to desiccate). The two-part system may include calcined kaolin clay. The calcined kaolin clay may stimulate the foaming (e.g., expansion) process from impurities present. The calcined kaolin clay may have an average particle size of 1.3 microns, as measured via average stokes equivalent diameter. The calcined kaolin clay may have an average particle size of 3.2 microns, as measured via median Malvern laser. An example of a suitable calcined kaolin clay may be that sold under the trade name KaMin® 70C commercially available from KaMin® LLC (Macon, GA).

The calcined kaolin clay may be present as a part of the A-side. The calcined kaolin clay may be present in an amount from about 0.25% to about 5% by weight of the A-side. The calcined kaolin clay may be present in an amount from about 1% to about 4% by weight of the A-side, B-side, or both the A-side and B-side in combination. The calcined kaolin clay may be present in an amount of about 2% by weight A-side.

The two-part system may include one or more reinforcing fibers. The reinforcing fiber may function to structurally reinforce the reaction product. The one or more reinforcing fibers may improve tensile strength, flexural strength, or both of the reaction product. The one or more reinforcing fibers may be present in the A-side, the B-side, or both. The one or more reinforcing fibers may be dispersed homogenously within the A-side, the B-side, or both. The one or more reinforcing fibers may comprise polymeric fibers, glass fibers (i.e., fiberglass), or both. Polymeric fibers may include nylon, polyamide, polyester, polypropylene, polyethylene, polytetrafluoroethylene, aramid fibers (e.g., Kevlar®), the like, or any combination thereof. The glass fibers may include alumino-borosilicate glass ("E-glass"), alkali-lime glass ("A-glass" or "C-glass"), electrical/chemical resistance glass ("E-CR-glass"), borosilicate glass ("D-glass"), alumino-silicate glass ("R-glass" or "S-glass"), or any combination thereof. The reinforcing fiber may be chopped fiber. The reinforcing fiber may be a chopped length of about 0.1 cm or more, about 0.3 cm or more, or even about 0.6 cm or more. The reinforcing fiber may be a chopped length of about 2.0 cm or less, about 1.5 cm or less, or even about 1.0 cm or less. Examples of suitable fiberglass may be chopped strands commercially available from Jushi USA (Columbia, SC).

The reinforcing fiber may be present in the amount from about 0.01% by weight to about 15% by weight of the A-side, B-side, or both the A-side and B-side in combination. The reinforcing fiber may be present in the amount from about 1% by weight to about 10% by weight A-side, B-side, or both the A-side and B-side in combination. The reinforcing fiber may be present in the amount of about 3% by weight A-side, B-side, or both the A-side and B-side in combination.

The two-part system may include hydrophobic silica. The hydrophobic silica may function to control viscosity (e.g., thicken), control thixotropy, boost hydrophobia, or a combination thereof. The hydrophobic silica may be fumed silica. The hydrophobic silica may be surface treated. For example, the hydrophobic silica may be fumed silica surface-treated with polydimethylsiloxane (hereinafter "PDMS") or hexamethyldisilazane (hereinafter "HMDZ"). The hydrophobic silica may be present as part of the A-side, the B-side, or both. Examples of suitable hydrophobic silica may be that sold under the trade name AEROSIL® R 202 commercially available from Evonik Corporation (Parsippany, NJ); and those sold under the trade name CAB-O-SIL® TS-530 and TS-720 commercially available from Cabot Corporation (Boston, MA).

The hydrophobic silica may be present in an amount of about 0.25% to about 15% by weight of the A-side, B-side, or both the A-side and B-side in combination. The hydrophobic silica may be present in an amount of about 0.1% to about 4% by weight of the A-side, B-side, or both the A-side and B-side in combination. The hydrophobic silica may be present in an amount from about 1% to about 3% by weight of the A-side, B-side, or both the A-side and B-side in combination. The hydrophobic silica may be present in an amount from about 1% by weight of the A-side. The hydrophobic silica may be present in an amount from about 1% to about 3% by weight of the B-Side. The ratio of hydrophobic silica in the A-side to the B-side may be from about 1:3 to about 3:1. The ratio of hydrophobic silica in the A-side to the B-side may be about 1:2 to about 2:1.

The two-part system may include tabular alumina. The tabular alumina may function to impart hardness, resistance to thermal shock, resistance to mechanical shock, high heat capacity, high electrical resistance, or any combination thereof, to the reaction product. The tabular alumina may be present in the A-side, the B-side, or both. The tabular alumina may be alpha alumina converted to its corundum form (i.e., crystalline aluminum oxide) and sintered and may be provided as graded granules or powders. The tabular alumina may be graded (i.e., separated by size) from about 44 microns to about 4760 microns. The tabular alumina may be graded to about 44 microns.

The tabular alumina may be present in an amount from about 3% to about 15% by weight A-side, B-side, or both the A-side and B-side in combination. The tabular alumina may be present in an amount from about 4% to about 12% by weight A-side, B-side, or both the A-side and B-side in combination. The tabular alumina may be present in an amount of about 5% by weight A-side. The tabular alumina may be present in an amount of about 10% by weight A-side.

The two-part system may include one or more functional additives for improving one or more various properties of the composition. Examples of suitable functional additives may include antioxidants, antiozonants, ultraviolet absorbers, antistatic agents, colorants, coupling agents, curing agents, flame retardants, blowing agents, heat stabilizers, impact modifiers, lubricants, plasticizers, preservatives, processing aids, stabilizers, the like, and any combination thereof.

The viscosity of the A-side, the B-side, or both may be high enough at about 23° C. in order to preclude the two-part system from undesirably flowing into areas adjacent the dispensed bead upon dispensing the two-part system on a workpiece or to control flow (i.e., permit a desired amount of flow) into areas adjacent the dispensed bead upon dispensing the two-part system. The viscosity of the A-side, B-side, or both, needed to preclude undesirable flow or control flow may depend on the size of the bead dispensed. For example, the thicker the bead of the two-part system dispensed, the higher the viscosity needed to preclude unintended flow or control flow. The viscosity of the A-side at 23° C. may be from about 20,000 cP to about 50,000 cP or even from about 35,000 cP to about 45,000 cP. The viscosity of the A-side and B-side at 23° C. may be from about 250,000 cP to about 400,000 cP. The viscosity of the A-side at 10° C. may be from about 280,000 cP to about 350,000 cP or even from about 300,000 cP to about 325,000 cP. The viscosity of the B-side at 23° C. may be from about 20,000 cP to about 50,000 cP or even from about 35,000 cP to about 45,000 cP. The viscosity of the B-side at 10° C. may be from about 130,000 cP to about 220,000 cP or even from about 175,000 cP to about 195,000 cP.

The two-part system may expand, upon mixing the A-side and B-side, more than about 10%, more than about 50%, more than about 100%, less than about 300%, less than about 200%, or even less than about 150% the two-part system's original volume. The two-part system may expand from about 50% to about 100% the two-part system's original volume.

The two-part system may be free of curing agents (i.e., typical curing agents), curing accelerators, or both. Typical curing agents include lewis bases (i.e., anionic catalysts), lewis acids (i.e., cationic catalysts), UV catalysts, amines, anhydrides, phenols, thiols, or any combination thereof. In place of the aforementioned curing agents, the two-part system may cure upon a polymerization reaction, catalyzed by phosphoric acid, between phosphate esters and epoxide groups, hydroxy groups, or both. The two-part system may be both cured and caused to expand by the chemical interaction between phosphate ester and calcium carbonate. It has been found that utilizing the cure and expansion system of the present disclosure may reduce the complexity of formulations by reducing the number of overall components (i.e., curing agents, curing accelerators, and blowing agents); however, the achievement of a desired expansion and time to cure is made more challenging to optimize.

In one non-limiting embodiment of the present teachings, the two-part system may include one or more of the following in the A-side ("first component"): one or more liquid epoxy resins, one or more epoxy phenol novolac resins, one or more aliphatic multifunctional epoxy resins, one or more phenoxy resins, one or more silane modified epoxy resins, one or more toughening agents (e.g., core-shell polymer), reinforcing fiber (e.g., aramid fiber), medium fine calcium carbonate, fine calcium carbonate, ultra-fine calcium carbonate, hydrophobic silica, minerals (e.g., Wollastonite), tabular alumina, or any combination thereof. The two-part system may include one or more of the following in the B-side ("second component"): a first phosphate ester, a second phosphate ester, a third phosphate ester, a surfactant, a monomer, a mineral (e.g., Wollastonite), a hydrophobic silica, phosphoric acid, or a combination thereof.

The two-part system may be mixed together at a ratio from 1:6 to 6:1, A-side to B-side. The two-part system may be mixed together at a ratio from 1:4 to 4:1, A-side to B-side. The two-part system may be mixed together at a ratio of 1:1, A-side to B-side. The two-part system may be mixed together at a ratio of about 4:1, A-side to B-side.

Non-limiting example formulation ranges in accordance with the present teachings is provided below in Table 1.

TABLE 1

| First Component (A-Side) | Weight % |
|---|---|
| Liquid epoxy resin | 4-15 |
| First epoxy phenol novolac resin | 30-50 |
| Aliphatic multifunctional epoxy resin | 10-22 |
| Phenoxy resin | 7-12 |
| Silane modified epoxy resin | 2-6 |
| Bisphenol A, butadiene-acrylic copolymer mixture | 5-20 |
| Fiberglass | 1-3 |
| Tabular alumina | 3-15 |
| Calcium carbonate | 2-12 |
| Fumed silica | 1-3 |
| Wollastonite | 3-7 |

| Second Component (B-Side) | Weight % |
|---|---|
| First phosphate ester | 10-30 |
| Second phosphate ester | 5-40 |
| Third phosphate ester | 25-65 |
| Monomer | 14-22 |
| Wollastonite | 3-7 |
| Fumed silica | 1-3 |
| Phosphoric Acid | 2-6 |

Additional Examples ("I.E.") of formulations in accordance of the present teachings are provided below in Tables 2 and 3. Amounts are expressed as weight percent.

TABLE 2

| First Component (A-Side) | I.E.1 | I.E.2 | I.E.3 | I.E.4 | I.E.5 | I.E.6 |
|---|---|---|---|---|---|---|
| Liquid epoxy resin | 7.8 | 7.8 | 7.9 | 0.0 | 14.9 | 7.8 |
| Liquid epoxy resin | 0.0 | 0.0 | 0.0 | 11.9 | 0.0 | 0.0 |
| Epoxy phenol novolac resin A | 27.2 | 27.2 | 27.7 | 27.7 | 27.8 | 27.2 |
| Epoxy phenol novolac resin B | 14.6 | 14.6 | 14.9 | 9.9 | 9.9 | 14.6 |
| Epoxidized sorbitol A | 20.4 | 20.4 | 20.8 | 0.0 | 0.0 | 20.4 |
| Epoxidized sorbitol B | 0.0 | 0.0 | 0.0 | 12.9 | 0.0 | 0.0 |
| Bisphenol A, butadiene-acrylic copolymer mixture | 4.9 | 4.9 | 5.0 | 16.8 | 19.9 | 4.9 |
| Phenoxy resin | 0.0 | 0.0 | 0.0 | 0.0 | 9.9 | 0.0 |
| Silane modified epoxy resin | 0.0 | 0.0 | 0.0 | 0.0 | 4.0 | 0.0 |
| Tabular alumina | 9.7 | 9.7 | 9.9 | 9.9 | 5.0 | 6.8 |
| Fiberglass | 0.0 | 0.0 | 0.0 | 0.0 | 0.0 | 2.9 |
| Calcium carbonate | 4.9 | 4.9 | 4.0 | 1.5 | 2.0 | 4.9 |
| Calcium carbonate (fine) | 4.9 | 4.9 | 4.0 | 0.0 | 0.0 | 4.9 |
| Calcium carbonate (ultra-fine) | 0.0 | 0.0 | 0.0 | 0.5 | 0.7 | 0.0 |
| Fumed silica A | 1.0 | 1.0 | 1.0 | 0.0 | 0.0 | 1.0 |
| Fumed silica B | 0.0 | 0.0 | 0.0 | 1.0 | 1.0 | 0.0 |
| Wollastonite | 4.9 | 4.9 | 5.0 | 7.9 | 5.0 | 4.9 |
| TOTAL | 100 | 100 | 100 | 100 | 100 | 100 |

TABLE 2-continued

| First Component (A-Side) | I.E.1 | I.E.2 | I.E.3 | I.E.4 | I.E.5 | I.E.6 |
|---|---|---|---|---|---|---|
| First Phosphate acid ester | 0.0 | 21.4 | 21.4 | 22.2 | 0.0 | 21.4 |
| Second Phosphate acid ester | 0.0 | 35.0 | 35.0 | 0.0 | 0.0 | 35.0 |
| Second Phosphate acid ester | 24.3 | 0.0 | 0.0 | 10.1 | 0.0 | 0.0 |
| Second Phosphate Ester | 0.0 | 0.0 | 0.0 | 0.0 | 11.9 | 0.0 |
| Third Phosphate acid ester | 63.1 | 31.1 | 31.1 | 58.6 | 58.4 | 31.1 |
| Monomer | 0.0 | 0.0 | 0.0 | 0.0 | 17.8 | 0.0 |
| Wollastonite | 6.8 | 6.8 | 6.8 | 8.1 | 6.9 | 6.8 |
| Fumed silica A | 1.9 | 1.9 | 1.9 | 0.0 | 0.0 | 1.9 |
| Fumed silica B | 0.0 | 0.0 | 0.0 | 1.0 | 3.0 | 0.0 |
| Phosphoric acid (85%) | 3.9 | 3.9 | 3.9 | 0.0 | 3.0 | 3.9 |
| TOTAL | 100 | 100 | 100 | 100 | 100 | 100 |

TABLE 3

|  | I.E.7 | I.E.8 | I.E.9 |
|---|---|---|---|
| A Side |  |  |  |
| Liquid epoxy resin | 13.92 | 13.77 | 12.79 |
| Epoxy phenol novolac resin | 25.99 | 25.71 | 28.14 |
| Epoxidized sorbitol | 12.99 | 12.85 | 15.35 |
| Core shell polymer | 18.57 | 18.36 | 17.05 |
| Silane modified epoxy resin | 4.64 | 4.59 | 0.00 |
| Epoxonic adduct | 2.78 | 2.75 | 2.55 |
| Calcium carbonate (fine) | 0.27 | 0.73 | 1.06 |
| Calcium carbonate (medium fine) | 1.02 | 1.65 | 2.13 |
| Fumed silica | 1.20 | 1.19 | 0.42 |
| Wollastonite | 18.57 | 18.36 | 20.46 |
| Total | 100.00 | 100.00 | 100.00 |
| B Side |  |  |  |
| First phosphate ester | 15.81 | 15.81 | 7.19 |
| Second phosphate ester | 55.33 | 55.33 | 57.55 |
| Wollastonite | 18.97 | 18.97 | 23.02 |
| Fumed silica | 3.55 | 3.55 | 3.59 |
| Phosphoric acid 85% | 6.32 | 6.32 | 8.63 |
| Total | 100.00 | 100.00 | 100.00 |

Tables 4 and 5 provide the technical data of the formulations in accordance with Table 2 at ambient temperature. The compression modulus may be a function of the compressive stress (force per unit area) applied to a sample and the resulting compression (deformation). Thus, a higher compression modulus is desired. When observed as a ratio of density to compression modulus, a lower ratio may indicate an overall stronger matrix of the reaction product. Compressive properties were determined according to ASTM D1621 using 25.4 mm cubes. Test samples were compressed to 50% of the dimension of the cubes. The crosshead movement rate was kept constant at 12.7 mm/min.

TABLE 4

| A-Side & B-Side | I.E.2 | I.E.3 | I.E.4 | I.E.5 | I.E.6 |
|---|---|---|---|---|---|
| Density (g/cm$^3$) | 0.80 | 0.78 | 0.92 | 0.76 | 0.72 |
| Compression Modulus (mPa) | 928 | 366 | 1228 | 646 | 348 |
| Ratio | 0.0009 | 0.0021 | 0.0008 | 0.0012 | 0.0021 |
| Compression Peak Stress (mPa) | 36 | 40 | 43 | 26 | 28 |
| Compression Peak Load (kN) | 22 | 24 | 26 | 16 | 17 |

TABLE 5

|  | Test Method | I.E.7 | I.E.8 | I.E.9 |
|---|---|---|---|---|
| Mix Ratio | Volume of A and B side of the cartridge | 4:1 by Volume | 4:1 by Volume | 4:1 by Volume |
| Color |  | Blue | White | Orange |
| Cure Characteristics |  |  |  |  |
| Peak exotherm (° F)[1] | Dispensing 100 ml of material in a 400 ml beaker (radius of 3.4 cm, height of 2.7) | 305.5 | 308.4 | 307.7 |
| Time to reach to peak exotherm (min) |  | 5.5 | 6.5 | 6 |
| Full Cure time |  | 24 h | 24 h | 24 h |
| Volume Expansion |  |  |  |  |
| Expansion at 23 ° C. (%) | Dispensing 100 ml of material in a 400 ml beaker (radius of 3.4 cm, height of 2.7) | 55 | 155 | 220 |
| Expansion at 10 ° C. (%) |  | 55 | 140 | 200 |
| Expansion at 40 ° C. (%) |  | 110 | 215 | 310 |
| Tack free time (min) | ASTM C679 | 4.5 | 4.5 | 4.5 |
| Viscosity Part A (Poise) | Based on ASTM D4440 | 3000-4500 | 3000-4500 | 3000-4500 |
| Viscosity Part B (Poise) |  | 2500-3500 | 2500-3500 | 2500-3500 |
| Uncured Density (g/cc) | ASTM D1475 | 1.3-1.4 | 1.3-1.4 | 1.3-1.4 |
| Cured Density g/cc (lb/ft3) | ASTM D792 | 0.85 (53.1) | 0.55 (34.3) | 0.42 (26.2) |
| Tg (° C.) DMA | ASTM D4065 | 57 | 58 | 58 |
| Absorbed water when immersed for 24 h (%) |  |  |  |  |
| Measured immediately after pulling out of water | Based on ASTM D570 24 hours immersion 1X1X3" sample | 0.21 | 0.57 | 0.6 |
| Measured after 3 days kept at room temperature |  | 0.07 | 0.15 | 0.16 |
| Solvent Impermeability |  |  |  |  |
| Water | Based on GMW15473 U-shaped sample between 2 plates, 100 hours | No leak | No leak | No leak |
| Unleaded gas |  | No leak | No leak | No leak |
| Ethylene glycol |  | No leak | No leak | No leak |
| Horizontal Burn Rate (mm/min) | ASTM D 5132 | Self-Extinguishing | Self-Extinguishing |  |
| Compressive Properties[2] |  |  |  |  |
| Compression Modulus (MPa) | Based on ASTM C109M Samples were exposed to the temperatures of 325, 375, or 400° F. after curing | 1232 | 860 | 480 |
| Compression peak stress (MPa) |  | 39 | 23.5 | 12.9 |
| Compression Modulus (MPa) water submerged 24 h |  | 1172 | 935 | 843 |
| Compression peak stress (MPa) water submerged 24 h |  | 34.6 | 21.6 | 16.3 |
| Compression Modulus (MPa) 400° F. for 40 min |  | 756 | 724 | 408 |
| Compression peak stress (MPa) 400° F. for 40 min |  | 42 | 19.6 | 14 |
| Compression Modulus (MPa) 375° F. for 60 min |  | 1040 | 739 | 514 |
| Compression peak stress (MPa) 375° F. for 60 min |  | 28.5 | 20.4 | 16.4 |
| Compression Modulus (MPa) 325° F. for 30 min |  | 1307 | 905 | 590 |
| Compression peak stress (MPa) 325° F. for 30 min |  | 38.6 | 22.8 | 13.3 |
| Tensile properties |  |  |  |  |
| Tensile Modulus (MPa) | ASTM D638 | 4580 | 3930 |  |
| Tensile Strength (MPa) |  | 31.4 | 25.3 |  |
| Tensile Elongation (%) |  | 0.92 | 0.92 |  |
| Tensile Modulus (MPa) water immersed 24 h |  | 4300 | 4330 |  |
| Tensile Strength (MPa) water immersed 24 h |  | 32.8 | 25.5 |  |
| Tensile Elongation (%) water immersed 24 h |  | 0.93 | 0.72 |  |
| Lap Shear Strength (MPa)[3] |  |  |  |  |
| EG-60 (1.5 mm thick) | ASTM 1002 |  | 6.9 | 7.3 |
| Al-6061 T6 (2.0 mm thick) |  | 10.4 | 10.2 | 8.9 |
| Stainless Steel 304 (1.6 mm thick) |  | 8.4 | 8.5 | 6.4 |

TABLE 5-continued

|  | Test Method | I.E.7 | I.E.8 | I.E.9 |
|---|---|---|---|---|
| Structural Fiberglass (3.3 mm thick) |  | SF | SF | 4.3 |
| Garolite (3.3 mm thick) |  | 3.5 | SF | 5.2 |
| IDI Composite (2.5 mm thick) |  | SF | SF | 2 |

[1]Peak temperature of exotherm depends on shape and volume of cavity
[2]Based on compression tests performed on cubic samples prepared as 1 inch-cubes, compressed at the rate of 12.5 mm/min
[3]0.75 mm bond-line, 25.4 mm overlap, test rate 10 mm/min The two-part system may be provided as side-by-side cartridges, pails, or drums. The two-part system may be mixed prior to dispensing on a workpiece. The two-part system may be applied to a workpiece via any suitable dispenser by which the two-part system is mixed before dispensing on the workpiece. For example, the two-part system may be dispensed onto a workpiece via a static mixer that is configured to deliver a mixed curable composition that has a suitable mix ratio, as described herein.

The resulting reaction product provides excellent adhesion to many substrates along with a fast cure time. The resulting reaction product may provide excellent adhesion to glass, metal, polymer (e.g., thermoplastics, thermosets or thermosettables, or elastomers) or any combination thereof. Particularly, the reaction product provides excellent adhesion to thermoplastics in comparison to foamed thermoset alternatives.

The two-part system may be utilized in transportation applications. The two-part system may be utilized in automotive applications. The two-part system may be utilized in applications including but not limited to vehicle interiors, vehicle exteriors, commercial vehicles, building construction, or the like. The system can be utilized for diverse applications such as various industrial manufacturing operations and for various construction purposes.

The present teachings provide a method that may comprise providing a two-part system, the two-part system including an A-side (i.e., first component) and a B-side (i.e., second component). The A-side including one or more epoxy resins and the B-side including one or more phosphate esters and optionally phosphoric acid. The A-side and the B-side may be mixed to form a curable composition. The method may include a step of curing the curable composition of the at a temperature of less than 50° C., thereby forming a reaction product. The method may comprise a step of mixing the first component and the second component to form a reaction prod. The method may comprise a step of wherein the reaction product of the first component and the second component cures at a temperature of less than 50° C. The method may be employed with an A-side that includes one or more epoxy resins, calcium carbonate, or both. The method may be employed with a B-side that includes one or more phosphate esters, phosphoric acid, or both. The method may be employed with and A-side, a B-side, or both having one or more additives.

Use of the teachings herein may result in a material that exhibits sufficient flame retardancy to meet one or more of the requirements for demonstrating flame retardancy (e.g., to meet vertical burn and/or smoke density requirements (or some other requirement) as set forth in 14 C.F.R. § 25.853 and 14 C.F.R. § 25.856 (the United States Code of Federal Regulations for compartment interiors, including but not limited to 14 C.F.R. § 25.853(a), and the referenced Appendix F and procedures referenced therein), all of which are incorporated by reference for all purposes.

As used herein, unless otherwise stated, the teachings envision that any member of a genus (list) may be excluded from the genus; and/or any member of a Markush grouping may be excluded from the grouping.

Unless otherwise stated, any numerical values recited herein include all values from the lower value to the upper value in increments of one unit provided that there is a separation of at least 2 units between any lower value and any higher value. As an example, if it is stated that the amount of a component, a property, or a value of a process variable such as, for example, temperature, pressure, time and the like is, for example, from 1 to 90, preferably from 20 to 80, more preferably from 30 to 70, it is intended that intermediate range values such as (for example, 15 to 85, 22 to 68, 43 to 51, 30 to 32 etc.) are within the teachings of this specification. Likewise, individual intermediate values are also within the present teachings. For values which are less than one, one unit is considered to be 0.0001, 0.001, 0.01, or 0.1 as appropriate. These are only examples of what is specifically intended and all possible combinations of numerical values between the lowest value and the highest value enumerated are to be considered to be expressly stated in this application in a similar manner. As can be seen, the teaching of amounts expressed as "parts by weight" herein also contemplates the same ranges expressed in terms of percent by weight. Thus, an expression in the of a range in terms of "at least 'x' parts by weight of the resulting composition" also contemplates a teaching of ranges of same recited amount of "x" in percent by weight of the resulting composition."

Unless otherwise stated, all ranges include both endpoints and all numbers between the endpoints. The use of "about" or "approximately" in connection with a range applies to both ends of the range. Thus, "about 20 to 30" is intended to cover "about 20 to about 30", inclusive of at least the specified endpoints. Unless otherwise stated, a teaching with the term "about" or "approximately" in combination with a numerical amount encompasses a teaching of the recited amount, as well as approximations of that recited amount. By way of example, a teaching of "about 100" encompasses a teaching of 100.

The disclosures of all articles and references, including patent applications and publications, are incorporated by reference for all purposes. The term "consisting essentially of to describe a combination shall include the elements, ingredients, components or steps identified, and such other elements ingredients, components or steps that do not materially affect the basic and novel characteristics of the combination. The use of the terms "comprising" or "including" to describe combinations of elements, ingredients, components or steps herein also contemplates embodiments that consist of, or consist essentially of the elements, ingredients, components or steps.

Plural elements, ingredients, components or steps can be provided by a single integrated element, ingredient, component or step. Alternatively, a single integrated element, ingredient, component or step might be divided into separate plural elements, ingredients, components or steps. The disclosure of "a" or "one" to describe an element, ingredient, component or step is not intended to foreclose additional elements, ingredients, components or steps.

It is understood that the above description is intended to be illustrative and not restrictive. Many embodiments as well as many applications besides the examples provided will be apparent to those of skill in the art upon reading the above description. The scope of the invention should, therefore, be determined not with reference to the above description, but should instead be determined with reference to the appended claims, along with the full scope of equivalents to which such claims are entitled. The disclosures of all articles and references, including patent applications and publications, are incorporated by reference for all purposes. The omission in the following claims of any aspect of subject matter that is disclosed herein is not a disclaimer of such subject matter, nor should it be regarded that the inventors did not consider such subject matter to be part of the disclosed inventive subject matter.

We claim:

1. A two-part system comprising:
   a) a first component including one or more epoxy resins or epoxy-functionalized resins;
   b) a second component including one or more phosphate esters including: a phosphate ester derived from: a reaction of orthophosphoric acid, polyphosphoric acid, or both and phenyl glycidyl ether; a reaction of orthophosphoric acid, polyphosphoric acid, or both and an epoxidized para-tertiary butyl phenol; a reaction of orthophosphoric acid, polyphosphoric acid, or both and a nonyl phenol ethoxylated phosphate ester; or any combination thereof;
   wherein the first component and the second component are liquid at room temperature and upon mixing the first component with the second component at room temperature, a composition is formed that is solid.

2. The two-part system of claim 1, wherein upon mixing the first component and the second component, the composition cures at a temperature of about 0° C. to about 50° C.

3. The two-part system of claim 2, wherein upon mixing the first component and the second component, the composition undergoes volume expansion of 0% to 500%.

4. The two-part system of claim 1, wherein the one or more phosphate esters includes a phosphate ester derived from cashew nutshell liquid, a phosphate ester derived from 2-ethylhexyl glycidyl ether, or both.

5. The two-part system of claim 1, including calcium carbonate, present in an amount of from about 0.1% to about 40%, by weight.

6. The two-part system of claim 5, wherein the calcium carbonate includes an ultrafine calcium carbonate, a fine calcium carbonate, a medium fine calcium carbonate, or any combination thereof.

7. The two-part system of claim 5, wherein the first component includes a fine calcium carbonate in an amount of from about 0.1% to about 10%, by weight, and a medium fine calcium carbonate in an amount of from about 0.1% to about 30%, by weight.

8. The two-part system of claim 5, wherein the first component includes an ultrafine calcium carbonate in an amount of from about 0.1% to about 10%, by weight, and a medium fine calcium carbonate in an amount of from about 0.1% to about 20%, by weight.

9. The two-part system of claim 4, wherein the one or more epoxy resins or epoxy-functionalized resins include one or more liquid epoxy resins, one or more epoxy phenol novolac resins, one or more aliphatic multifunctional epoxy resins, one or more phenoxy resins, one or more silane modified epoxy resins, or any combination thereof.

10. The two-part system of claim 9, wherein the one or more liquid epoxy resins include a reaction product of epichlorohydrin and bisphenol A; a reaction product of epichlorohydrin and bisphenol F; or both.

11. The two-part system of claim 9, wherein the one or more epoxy phenol novolac resins including a formaldehyde oligomeric reaction product with 1-chloro-2,3-epoxypropane and phenol; a poly[(phenyl glycidyl ether)-co-formaldehyde]; or both.

12. The two-part system of claim 9, wherein the one or more epoxy phenol novolac resins include an epoxy phenol novolac resin with a functionality from about 2 to about 3; an epoxy phenol novolac resin with a functionality from about 3 to about 4; or both.

13. The two-part system of claim 9, wherein the one or more aliphatic multifunctional epoxy resins include an epoxidized sorbitol.

14. The two-part system of claim 10, wherein the one or more liquid epoxy resins are present in an amount of from about 4% to about 60%, by weight.

15. The two-part system of claim 11, wherein the one or more epoxy phenol novolac resins are present in an amount of from about 0.1% to about 50%, by weight.

16. The two-part system of claim 13, wherein the one or more aliphatic multifunctional epoxy resins are present in an amount of from about 0.1% to about 40%, by weight.

17. The two-part system of claim 9, wherein the one or more phenoxy resins are present in an amount of from about 0.1% to about 12%, by weight.

18. The two-part system of claim 9, wherein the one or more silane modified epoxy resins are present in an amount of from about 1% to about 25%, by weight.

19. The two-part system of claim 3, wherein the composition has a cure time of from about 1 minute to about 30 minutes.

20. The two-part system of claim 9, wherein the two-part system is substantially free of curing agents, latent curing accelerators, or both.

21. A two-part system comprising:
   a) a first component including one or more epoxy resins or epoxy-functionalized resins;
   b) a second component including one or more phosphate esters including a phosphate ester derived from an epoxidized para-tertiary butyl phenol, a nonyl phenol ethoxylated phosphate ester, or both;
   wherein the first component and the second component are liquid at room temperature and upon mixing the first component with the second component at room temperature, a composition is formed that is solid.

* * * * *